US006588103B2

(12) United States Patent
Fernihough et al.

(10) Patent No.: US 6,588,103 B2
(45) Date of Patent: Jul. 8, 2003

(54) TIP MATERIAL FOR A TURBINE BLADE AND METHOD OF MANUFACTURING OR REPAIRING A TIP OF A TURBINE BLADE

(75) Inventors: John Fernihough, Ennetbaden (CH); Maxim Konter, Klingnau (CH); Andreas Bögli, Wettingen (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/821,091

(22) Filed: Mar. 30, 2001

(65) Prior Publication Data
US 2001/0025418 A1 Oct. 4, 2001

(30) Foreign Application Priority Data
Apr. 3, 2000 (EP) .............................. 00107245

(51) Int. Cl.⁷ ................................. B23P 15/26
(52) U.S. Cl. ............. 29/889.1; 29/889.72; 29/402.08; 29/402.13; 29/402.16
(58) Field of Search ............... 29/889.1, 889.7, 29/889.72, 402.04, 402.05, 402.6, 402.07, 402.08, 402.13, 402.16; 228/119

(56) References Cited
U.S. PATENT DOCUMENTS

| 4,155,152 | A | * | 5/1979 | Cretella et al. .......... 29/402.18 |
| 4,214,355 | A | * | 7/1980 | Zelahy ...................... 228/182 |
| 4,390,320 | A | * | 6/1983 | Eiswerth ................... 29/889.1 |
| 4,400,915 | A | * | 8/1983 | Arrigoni ................... 29/889.1 |
| 4,789,441 | A | * | 12/1988 | Foster et al. .................. 205/50 |
| 4,832,252 | A | | 5/1989 | Fraser |
| 5,507,623 | A | * | 4/1996 | Kojima et al. .......... 416/241 R |
| 5,622,638 | A | | 4/1997 | Schell et al. |
| 5,711,068 | A | * | 1/1998 | Salt ............................ 29/889.1 |
| 5,794,338 | A | | 8/1998 | Bowden, Jr. et al. |
| 5,898,994 | A | * | 5/1999 | Miller et al. .................... 134/2 |
| 5,913,555 | A | * | 6/1999 | Richter et al. ........... 29/402.08 |
| 6,042,879 | A | * | 3/2000 | Draghi et al. .............. 29/889.1 |
| 6,302,318 | B1 | * | 10/2001 | Hasz et al. .................. 228/254 |
| 6,398,103 | B2 | * | 6/2002 | Hasz et al. .................. 228/119 |
| 6,416,882 | B1 | * | 7/2002 | Beele et al. ................. 428/633 |
| 6,440,575 | B1 | * | 8/2002 | Heimberg et al. .......... 428/472 |
| 2001/0006187 | A1 | * | 7/2001 | Hasz et al. .................. 228/119 |

FOREIGN PATENT DOCUMENTS

| EP | 0361655 A2 | 4/1990 |
| EP | 0676259 A1 | 10/1995 |

* cited by examiner

*Primary Examiner*—I Cuda Rosenbaum
(74) *Attorney, Agent, or Firm*—Burns, Doane, Swecker & Mathis, L.L.P.

(57) ABSTRACT

A tip material for a turbine blade or for repairing a damaged tip of a turbine blade having a metallic coating, the material used for the tip is equivalent in composition to the metallic coating material used for the turbine blade.

Also disclosed is a method of manufacturing or repairing a tip of a turbine blade having a metallic coating by reforming the blade tip with a material equivalent in composition to the metallic coating material used for the turbine blade by bonding the material to the damaged tip.

7 Claims, No Drawings

TIP MATERIAL FOR A TURBINE BLADE AND METHOD OF MANUFACTURING OR REPAIRING A TIP OF A TURBINE BLADE

TECHNICAL FIELD

The invention relates to a tip material for a turbine blade or for repairing a damaged tip of a turbine blade in accordance with the preamble of the first claim.

It likewise relates to a method of manufacturing or repairing a tip of a turbine blade in accordance with the preamble of the independent method claim.

BACKGROUND OF THE INVENTION

Turbine components such as blades or vanes operate at high temperatures and under conditions of extreme environmental attack such as oxidation. The tip of turbine blades is normally the point of highest temperature on the part, and is especially subject to degradation by oxidation and/or wear. Conditions at the blade tip are often so extreme that ceramic thermal barrier coatings and oxidation resistant coatings experience limited lives and are ultimately consumed before the blade is removed from service for repair. It is therefore common for the tips of blades to require partial or complete replacement during the repair/reconditioning intervals.

As a result, several disclosures have been made regarding methods and materials to be used for the replacement procedure. There are generally two approaches to replacing the tip: removing by some method the damaged part of the tip until high quality material is exposed, then a progressive build-up using any welding overlay procedure or the brazing or welding of previously manufactured coupon of material to the newly exposed surface of the tip. U.S. Pat. No. 5,794,338 discloses the practice of not removing coating adjacent to the tip face to be repaired, whereas standard practice was to remove such adjacent coating material up to several mm below the repair surface so that it does not interfere with the repair operations.

It is further known that the replacement material should be wear resistant or oxidation resistant as in U.S. Pat. No. 5,622,638 where a composition is given which is very significantly different from the base composition of the underlying blade and has no specified relationship to the coating material used for the part.

In some disclosures as U.S. Pat. No. 4,832,252 materials for tip replacements are used that are compatible with or equivalent to the base material but if different, no particular advantage is specified.

It is always problematic to find a Ni based alloy that will be compatible with a second Ni based alloy upon which it is deposited and left in contact at high temperatures for extended periods of time because of the interdiffusion zone that forms between the two alloys, this is made worse when the two are mixed over a certain zone as in welding. It is known that each precipitation strengthened nickel based alloy is carefully designed and balanced so as to precipitate a desired volume fraction of strengthening (but brittle) gamma prime as cuboidal precipitates separated by softer gamma phase. Each alloy is also carefully formulated to avoid the precipitation of harmful TCP (topologically close packed), which seriously degrade high temperature properties. When two alloys are allowed to diffuse into each other across an interface, the careful balance of alloying elements is seriously disrupted in the region of interdiffusion where the two alloys effectively mix. The result is often that continuous bands of brittle gamma prime form and there is relatively heavy precipitation of TCP phases (needles and/or plates), both serving as easy crack paths. Failure often occurs as cracks propagate not in the alloys, but in the interdiffusion zone between the alloys.

This is particularly problematic when one alloy is rich in Al and Cr as in oxidation resistant materials, because increasing a base material composition in these elements promotes the strongest undesirable precipitates. It is particularly at the high temperatures experienced at the blade tip that gamma prime banding and TCP phases precipitation occurs the most rapidly and to the greater volume fraction, several degrading high temperature properties. The aero-engine centered repair industry may not face this problem to a great extent due to the relatively short operating lives of aero-engine components between repair intervals. However, industrial and heavy-duty land based gas turbine components experience much longer continuous operating times between repair intervals and are more sensitive to such alloy—alloy interactions at the tip.

SUMMARY OF THE INVENTION

Accordingly, one object of the invention is to provide a tip material that will minimize the harmful precipitation in the region of both the coating-tip and base material-tip interfaces.

According to the invention, this is achieved by the features of the first claim.

The core of the invention is therefore that the material used for the tip is equivalent in composition to the coating material used for the alloy or a modified version of the coating composition in which the yttrium content (or other rare earth element) is controlled to smaller amounts, in the range of 5–1000 ppm, preferred range 15–200 ppm.

The advantages of the invention can be seen, inter alia, in the fact that the problems in the interdiffusion zone between the material of the tip and the blade are minimized because the coating has already been developed to minimize problems in the interdiffusion zone between blade and coating The precipitation of harmful TCP (topologically close packed) is avoided and therefore the danger of propagation of cracks in the interdiffusion zone.

As no third materials being used to replace the tip there are no compatibility problems in the new tip—blade interface, but also in the new tip—extra coating interface, as they are equivalent in composition.

Because of the intentional yttrium additions, which may either be the same as in the coating alloy (generally around 3000 PPM) or controlled to a smaller amount in the range of 5–1000 PPM, preferred range 15–200 ppm, it has been found unexpectedly that in the said range of yttrium contents, weldability is improved to acceptable levels while oxidation resistance is maintained.

The advantage of the present invention over the prior art is that the replacement tip will not experience any welding incompatibilities with the original part coating to which it is welding and minimal such incompatibilities with the base material of the component itself, since the coating was designed to be in contact with base material. Furthermore, the replacement tip will never need additional environmentally resistant coatings other than thermally insulating TBC coatings when desired. This saves considerable processing time and money during the repair of the component.

Further advantageous embodiments of the invention emerge from the subclaims. Moreover, a method of manufacturing or repairing a tip of a turbine blade having a metallic coating is further specified.

Even if the new tip material is welded or added directly to the coating there are no problems in the mixing zone between the original coating and the new tip material as they are equivalent in composition. In addition to being perfectly compatible with the old coating, there are minimal incompatibility problems with welding or bonding to the blade material.

DESCRIPTION OF THE PREFERRED EMBODIMENTS

The present invention provides an improved blade tip for turbine blades used in gas turbine engines, and particularly turbine blades used in the high-pressure turbine section of axial flow gas turbine engines.

The blade is preferably formed from a suitable high temperature material, such as an appropriate nickel-based superalloy of the type known in the art, and may be cast as single crystal or directionally solidified casting to promote the high temperature properties of the blade In accordance with this invention, the tip material is equivalent to the oxidation resistant coating material used for the nickel-base superalloy of the blade. An equivalent material is herewith defined as a material that has overlapping or nearby composition ranges to the referring material and some optional elements. Additionally the rare earth element content can be controlled to smaller amounts. For a superalloy known as MK4 and disclosed in U.S. Pat. No. 5,759,301 with a compositional range of, noted in mass percent, 6.3–6.6% Cr, 9.3–10% Co, 0.5–0.7% Mo, 6.2–6.6% W, 6.3–6.7% Ta, 2.8–3.1% Re, 5.45–5.75% Al, 0.9–1.1% Ti, 0.17–0.23% Hf, 0.02–0.03% C, 50–80 ppm B, balance Ni, a coating known as SV34 with a compositional range of, noted in mass percent, 11.8–12.8% Cr, 23.5–24.5% Co, 0.4–0.6% Y, 2.8–3.0% Re, 11.6–12.2% Al, 0.4–0.6% Ta, 0.8–1.2% Si, max 0.03% C, max 400 ppm 0, max 100 ppm N, max 10 ppm S, balance Ni could be used.

The material used for the tip is the same as the above coating material. It is also possible to use a modified equivalent version of the coating composition in which the rare earth element content is controlled to smaller amounts, in the range of 5–1000 ppm, preferred range 15–200 ppm.

The most preferred rare earth element is yttrium which content is therefore controlled to smaller amounts, in the range of 5–1000 ppm, preferred range 15–200 ppm.

For the tip also another coating B which is equivalent to the above coating SV34 with a compositional range of, noted in mass percent, Cr 12–14%; Al 11–12%; Co 24–34%; Si 1–2%; Ta 0.5–1.05%; Y 0.3–0.5%; Re 0–3%; Ni balance can be used. The rare earth element, preferably yttrium content of this coating composition can also be altered to smaller amounts, in the range of 5–1000 ppm, preferred range 15–200 ppm. This material can also be used as the base coating instead of the above SV34, the tip can then be made of this coating B, the above equivalent coating SV34 or their above altered versions.

The above superalloy known as MK4 can also be coated by a coating known as SV20 with a compositional range of, noted in mass percent, 24.0–26.0% Cr, 5.0–6.0% Al, 2.5–3.0% Si, 0.5–0.8% Y, 0.8–1.2% Ta, max 0.03% C, max 400 ppm 0, max 100 ppm N, balance Ni could be used.

The material used for the tip is the same as the above coating material. It is also possible to use a modified equivalent version of the coating composition in which the rare earth element content, most preferred rare earth element is yttrium, is controlled to smaller amounts, in the range of 5–1000 ppm, preferred range 15–200 ppm.

For the tip also another coating A which is equivalent to the above coating SV20 with a compositional range of, noted in mass percent, Cr 13–26%; Al 5.5–7.5%; Co 0–15%; Si 0.7–3%; Ta 1–1.5%; Y 0.3–0.5%; Re 0–3%; Nb 0–1% Ni balance can be used. The rare earth element, preferably yttrium content of this coating composition can also be altered to smaller amounts, in the range of 5–1000 ppm, preferred range 15–200 ppm. This material can also be used as the base coating instead of the above SV20, the tip can then be made of this coating A, the above equivalent coating SV20 or their above altered versions.

The tip of the turbine blade can be built up or repaired by well-known methods as laser welding or TIG (Tungsten Inert Gas) welding or plasma arc spraying or HVOF (High Velocity Oxy-Fuel) or galvanic deposition, wherein the most preferred is laser welding. Normally powder or wire weld material can be used to deposit the material.

The tip material can also be deposited by brazing a preform to the blade tip, where the preform may have a preferred crystallographic orientation relative to the component when the component is a single crystal. Preferably the total misorientation between the preform and component is not greater than 15°.

The tip can also be repaired according to U.S. Pat. No. 5,794,338, which is enclosed herewith by reference. The method includes removing the damaged, coated tip to provide a preform end surface on the member without first removing any of the coating on the outer wall adjacent the tip. The coating is retained on the wall adjacent the preform end surface, as well as within any hollow tip interior or recess. A replacement tip material as described above is bonded to the end surface to provide a repaired member preform having a second length greater than the designed length. Then a portion of the replacement tip material is removed to provide the member with a repaired member tip of substantially the designed length, while retaining the coating on the wall adjacent the repaired members tip.

Following the manufacturing or repairing of a tip according to the above teachings, a thermal barrier coating can be applied to the surface of the blade.

The invention is of course not restricted to the exemplary embodiments shown and described. Further equivalent coatings to the above mentioned coatings could be used as tip replacement materials. As mentioned above any suitable high temperature material can be used to form the blade.

Obviously, numerous modifications and variations of the present invention are possible in light of the above teachings. It is therefore to be understood that within the scope of the appended claims, the invention may be practiced otherwise than as specifically described herein.

What is claimed is:

1. A method of repairing a tip of a turbine blade having a metallic coating, the method comprising the steps of:
   reforming the blade tip with a material by removing the damaged tip and bonding the material to a remaining portion of the turbine blade, the material is equivalent in composition to the metallic coating material used for the turbine blade and the material comprising a rare earth element content in the range of 5–1000 ppm.

2. The method of repairing a tip of a turbine blade as claimed in claim 1,
   the method comprising the steps of: removing the damaged tip to provide a preform end surface on the blade, while retaining the coating on an outer wall adjacent the preform end surface;

bonding tip material to the preform end surface to provide a repaired member preform having a second length greater than a designed length of the blade; and removing a portion of the tip material to provide the blade with a repaired member tip and with substantially the designed length, while retaining the coating on the wall adjacent the repaired member tip.

3. A method of repairing a tip of a turbine blade as claimed in claim 1, wherein the tip material is deposited by laser welding or TIG welding or plasma arc spraying or HVOF or galvanic deposition.

4. A method of repairing a tip of a turbine blade as claimed in claim 1, the turbine blade being a single crystal, the method comprising: depositing the tip material by brazing a preform to the blade tip, the preform having a preferred crystallographic orientation relative to the single crystal blade.

5. A method of repairing a tip of a single crystal turbine blade as claimed in claim 4, wherein a total misorientation between the preform and blade is not greater than 15°.

6. A method of repairing a tip of a turbine blade as claimed in claim 1, the material comprising a rare earth element content in the range of 15–200 ppm.

7. A method of repairing a tip of a turbine blade as claimed in claim 1, the material comprising a Ytrium content in the range of 5–1000 ppm.

* * * * *